United States Patent
Prelesnik (10) Patent No.: US 10,173,602 B2
(45) Date of Patent: Jan. 8, 2019

(54) KAYAK CARRIER FOR VEHICLE HITCH

(71) Applicant: Joseph A. Prelesnik, Spring Lake, MI (US)

(72) Inventor: Joseph A. Prelesnik, Spring Lake, MI (US)

( * ) Notice: Subject to any disclaimer, the term of this patent is extended or adjusted under 35 U.S.C. 154(b) by 0 days.

(21) Appl. No.: 15/358,916

(22) Filed: Nov. 22, 2016

(65) Prior Publication Data

US 2017/0144610 A1    May 25, 2017

Related U.S. Application Data (60) Provisional application No. 62/258,723, filed on Nov. 23, 2015.

(51) Int. Cl.
| | | |
|---|---|---|
| *B60R 9/06* | (2006.01) | |
| *B60R 9/08* | (2006.01) | |
| *B60P 3/10* | (2006.01) | |

(52) U.S. Cl.
CPC .............. *B60R 9/06* (2013.01); *B60R 9/08* (2013.01); *B60P 3/10* (2013.01)

(58) Field of Classification Search
CPC .............. B60R 9/00; B60R 9/06; B60R 9/08
USPC ........ 224/502, 519, 522, 523, 533, 525, 529
See application file for complete search history.

(56) References Cited

U.S. PATENT DOCUMENTS

| | | | | | |
|---|---|---|---|---|---|
| 4,809,891 | A | * | 3/1989 | Patrin ................. | B62J 7/04 |
| | | | | | 224/413 |
| 5,806,738 | A | * | 9/1998 | D'Angelo ............ | B60R 9/08 |
| | | | | | 224/274 |
| 5,842,615 | A | * | 12/1998 | Goodness ............ | B60R 9/06 |
| | | | | | 224/485 |
| 6,039,227 | A | * | 3/2000 | Stark .................. | B60R 9/06 |
| | | | | | 206/315.3 |
| 6,427,854 | B1 | * | 8/2002 | Grossi ................ | B60R 9/06 |
| | | | | | 211/85.7 |
| 6,478,203 | B2 | * | 11/2002 | Burns ................ | B60R 9/065 |
| | | | | | 206/315.3 |
| 6,554,171 | B1 | * | 4/2003 | Ewing, III ........... | B60R 9/06 |
| | | | | | 211/85.7 |
| 7,487,895 | B2 | * | 2/2009 | Hesmer ............... | B60R 9/06 |
| | | | | | 224/519 |
| 8,590,758 | B2 | * | 11/2013 | Gray .................. | B60P 3/10 |
| | | | | | 224/501 |
| 8,800,831 | B2 | * | 8/2014 | Gray .................. | B60P 3/10 |
| | | | | | 224/501 |
| 9,114,759 | B1 | * | 8/2015 | Hudson ............... | B60R 9/08 |
| 9,199,583 | B2 | * | 12/2015 | Tressel ............... | B60R 9/08 |
| 2001/0035446 | A1 | * | 11/2001 | Walstrom ............ | B60R 9/06 |
| | | | | | 224/501 |
| 2005/0205630 | A1 | * | 9/2005 | Cooper ............... | B60R 9/06 |
| | | | | | 224/521 |

(Continued)

*Primary Examiner* — Brian D Nash (74) *Attorney, Agent, or Firm* — Gardner Linn (57) ABSTRACT

A kayak carrier for a vehicle hitch includes an elongated support having a lower portion configured to engage a vehicle hitch and an upper portion that is configured to provide support to an intermediate section of a kayak held by the kayak carrier. A tip receiver is coupled with the lower portion of the elongated support, where the tip receiver includes an engagement portion that is configured to receive and engage a tip section of the kayak. When the tip section of a kayak is received in the tip receiver, the kayak carrier is configured to hold the kayak in an upright orientation.

11 Claims, 7 Drawing Sheets

(56) References Cited

U.S. PATENT DOCUMENTS

| | | | | |
|---|---|---|---|---|
| 2009/0261136 A1* | 10/2009 | Skoff | ............. | B60R 9/06 |
| | | | | 224/519 |
| 2013/0022440 A1* | 1/2013 | Sautter | ............ | B60R 9/06 |
| | | | | 414/800 |
| 2013/0062383 A1* | 3/2013 | Jeli | ............ | B60R 9/10 |
| | | | | 224/497 |
| 2014/0291371 A1* | 10/2014 | Halley | ............ | A62C 27/00 |
| | | | | 224/522 |

* cited by examiner

KAYAK CARRIER FOR VEHICLE HITCH

CROSS REFERENCE TO RELATED APPLICATION

The present application claims the filing benefits of U.S. provisional application Ser. No. 62/258,723, filed Nov. 23, 2015, which is hereby incorporated herein by reference in its entirety.

FIELD OF THE INVENTION

The present invention generally relates to the field of accessory racks and carriers that attach to vehicles.

BACKGROUND OF THE INVENTION

It is known to secure bikes racks, storage containers, and cargo platforms to a vehicle hitch to provide a vehicle with additional carrying capacity without attaching a trailer to the vehicle or interfering with a trunk or roof area of the vehicle. Similarly, it is known to attach kayak and canoe racks, cradles, or mounts or the like to a vehicle roof, such as on existing vehicle roof rails, to secure a kayak or canoe in a horizontal orientation over the vehicle roof.

SUMMARY OF THE INVENTION

The present invention provides a carrier for kayaks, canoes, or other small boats or vessels that attaches to a vehicle hitch for easily loading and supporting the vessel in a generally vertical or otherwise upright orientation near the rear hitch area of a vehicle. The kayak carrier for a vehicle hitch includes an elongated support having a lower portion that is configured to engage the vehicle hitch and an upper portion that is configured to provide support to an intermediate section of a kayak held by the kayak carrier. A tip receiver is coupled with the lower portion of the elongated support. The tip receiver includes a receiving or engagement portion that is configured to receive or engage a tip section of the kayak, such that the kayak carrier is configured to hold the kayak in an upright orientation.

Optionally, the kayak carrier may include a laterally arranged member on the upper portion of the elongated support that is configured to provide rearward support to the intermediate section of the kayak held by the kayak carrier. Optionally, the kayak carrier may include an attachment strap that is configured to secure the intermediate section of the kayak to the elongated support when the kayak is in the upright orientation. Optionally, the upper portion of the elongated support of the kayak carrier may include a lateral retaining portion or member that protrudes forward (towards the vehicle) from an end portion of the laterally arranged member to provide lateral support to the intermediate section of the kayak.

Optionally, the tip receiver may be pivotally coupled with the elongated support. Such a pivotable tip receiver may be configured for a tip section of the kayak to engage the tip receiver when the kayak is in a generally horizontal orientation, allowing the kayak to then be raised to the upright orientation by pivoting the kayak and the tip receiver about the pivotal coupling of the tip receiver.

Optionally, the tip receiver may have a first engagement portion and a second engagement portion on opposing lateral sides of the elongated support for engaging tip sections of two separate kayaks that can be simultaneous supported by the kayak carrier. Optionally, the kayak carrier may include two tip receivers that are pivotally coupled with the lower portion of the elongated support, such that the tip receivers may be independently pivotal relative to each other for two kayaks to be separately loaded onto and supported by the kayak carrier in a side-by-side, upright orientation.

These and other objects, advantages, purposes and features of the present invention will become apparent upon review of the following specification in conjunction with the drawings.

DESCRIPTION OF THE PREFERRED EMBODIMENTS

Figure 1:
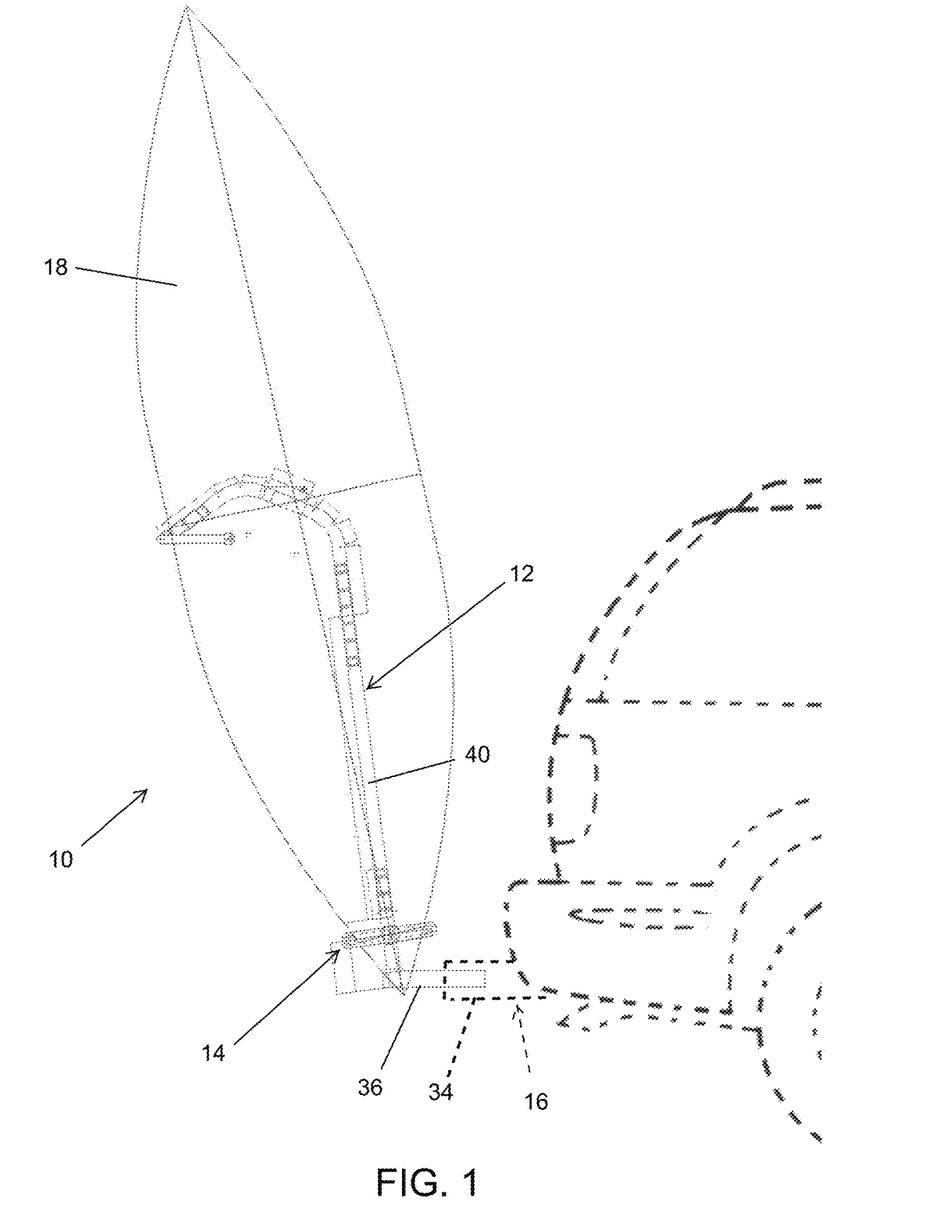
FIG. 1 is a side elevational view of a kayak carrier attached to a vehicle hitch and supporting a kayak, illustrating portions of the kayak carrier covered by the kayak, in accordance with the present invention.

Referring now to the drawings and the illustrative embodiments depicted therein, a kayak or canoe or vessel carrier 10, as shown in FIGS. 1-8, is generally comprised of an elongated support 12 and a tip receiver 14 disposed at or near a lower portion of the elongated support 12. The elongated support is configured to be secured or attached at a vehicle hitch 16. When the elongated support 12 is secured or attached to the vehicle hitch 16, a kayak 18 or other vessel can be loaded onto the carrier 10, as shown in FIG. 1. To support the kayak 18, the tip receiver 12 engages an end or tip section of the kayak 18 and the elongated support 12 extends upward to support an intermediate section of the kayak 18 and holds the kayak 18 in an upright orientation on the carrier 10. As shown in FIGS. 1-8, two tip receivers 14 may be pivotally coupled with the lower portion of the elongated support 12, such that the tip receivers 14 may be independently pivotable relative to each other for two kayaks to be separately loaded onto and supported by the kayak carrier 10 in a side-by-side, upright orientation. However, it is contemplated that a carrier may include a single tip receiver or otherwise may be configured to support more than two kayaks, canoes, or vessels.

Figure 6:
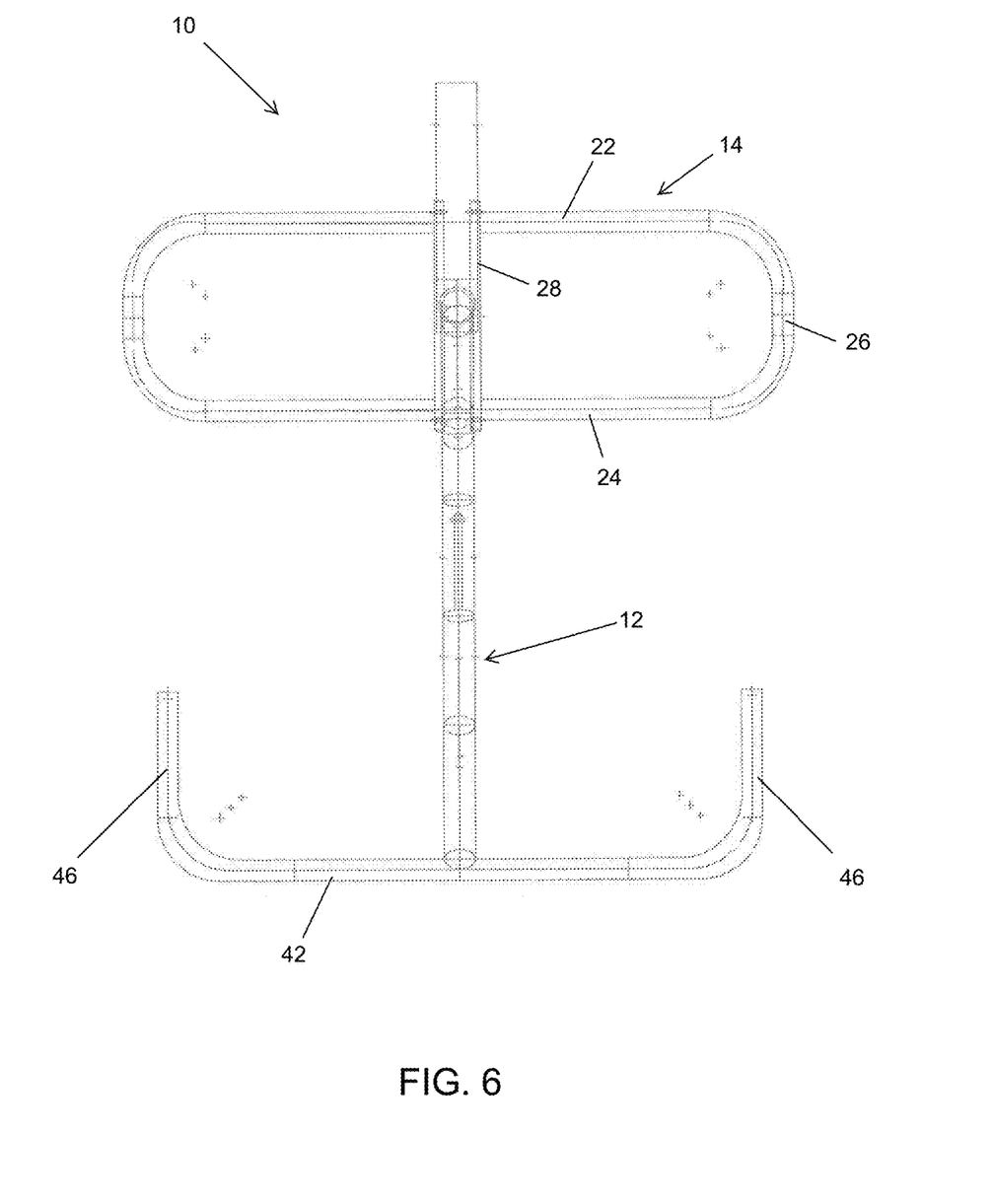
FIG. 6 is a top plan view of the kayak carrier of FIG. 1.
Figure 7:
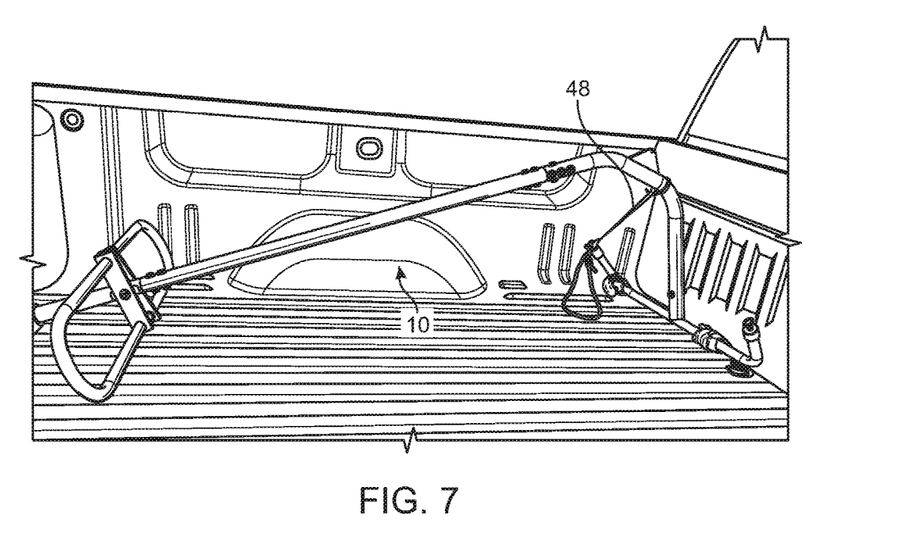
FIG. 7 is a side perspective view of the kayak carrier of the present invention.
Figure 8:
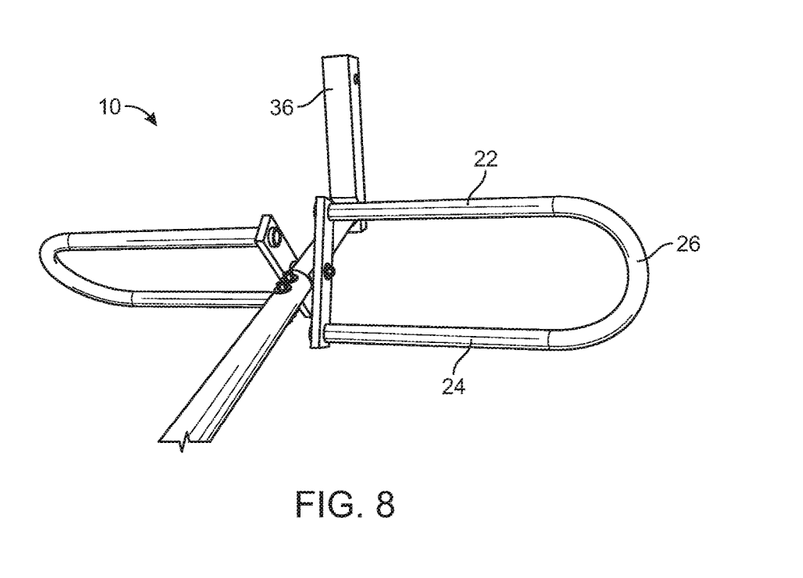
FIG. 8 is a perspective view of a lower portion of the kayak carrier of FIG. 7.

The tip receiver 14 extends laterally from the lower portion of the elongated support 12 and includes at least one engagement portion 20 (FIG. 4) that is configured to engage the tip section of the kayak 18. The engagement portion 20 is sized to receive and engage and support at least the forward and rearward oriented surfaces of the tip section of the kayak 18 when the kayak is held on the carrier 10, such that the weight of the kayak 18 holds the tip section in secure and abutting engagement with opposing side of the tip receiver 14, such as at a forward member 22 and at a rearward member 24 of the tip receiver 14. The tip receiver 14 may also include an outboard member 26 that interconnects between the forward and rearward members 22, 24 of the tip receiver 14 to further secure the tip section of the kayak and prevent lateral movement of the tip section. In the illustrated example of FIG. 6, the outboard member 26 and forward and rearward members 22, 24 are an integral piece that may be bent or otherwise formed to include the curved corners between the outboard member 26 and forward and rearward members 22, 24. Optionally, the outboard member 26 may be a continuously curved shape, as shown in FIGS. 7 and 8, and optionally the forward and rearward members 22, 24 may be otherwise shaped to conform to the shape of the tip section of a particular kayak or vessel desired to be transported on the carrier 10.

The tip receiver 14 may further include an inboard member 28 that is connected, such as in a movable or pivotal manner, with the elongated support 12. As shown in the illustrated examples, the inboard member 28 of the tip receiver 14 may interconnect between the forward and rearward members 22, 24, such as to form a rigid D-shaped receiver with the outboard member 26 that defines a D-shaped opening or engagement portion 20.

Figure 2:
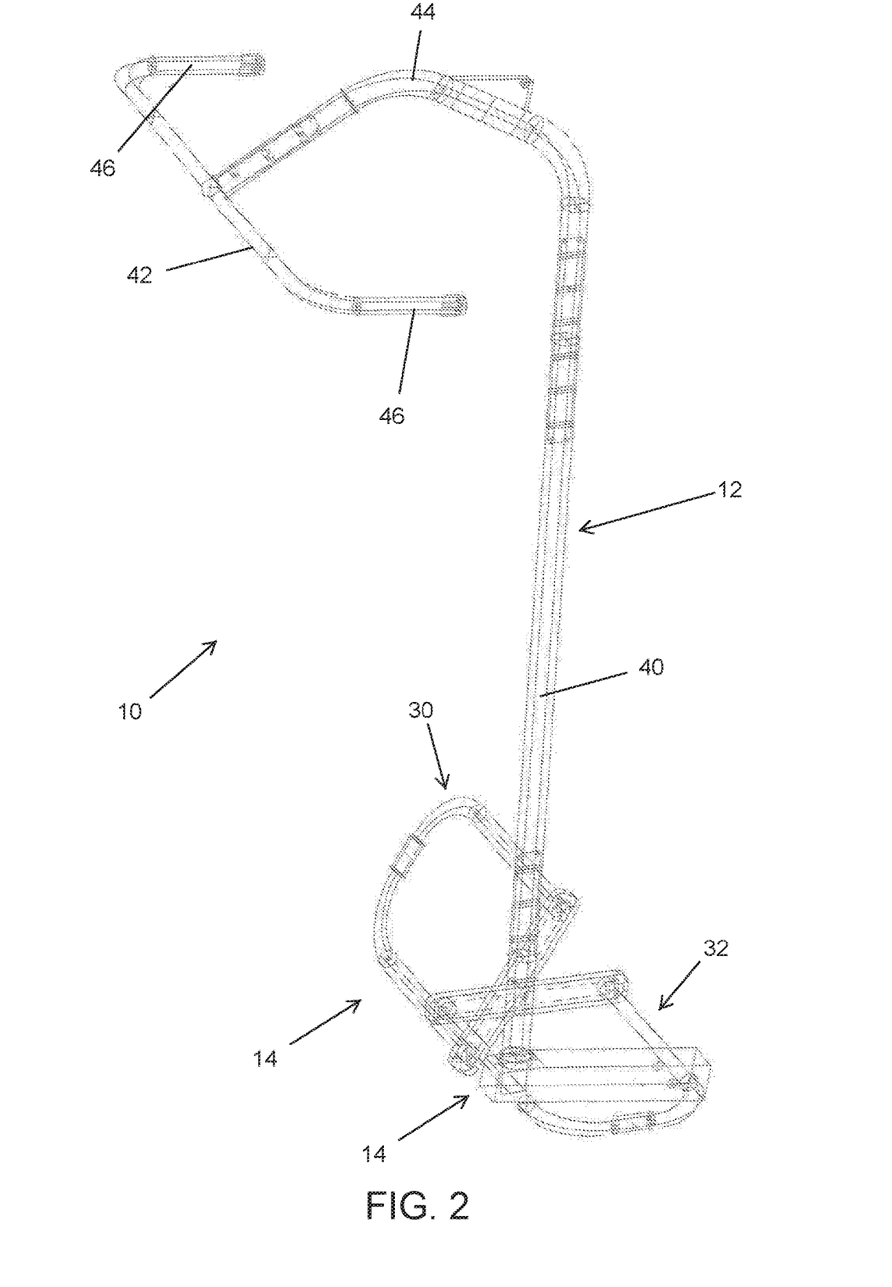
FIG. 2 is an upper perspective view of the kayak carrier of FIG. 1.
Figure 3:
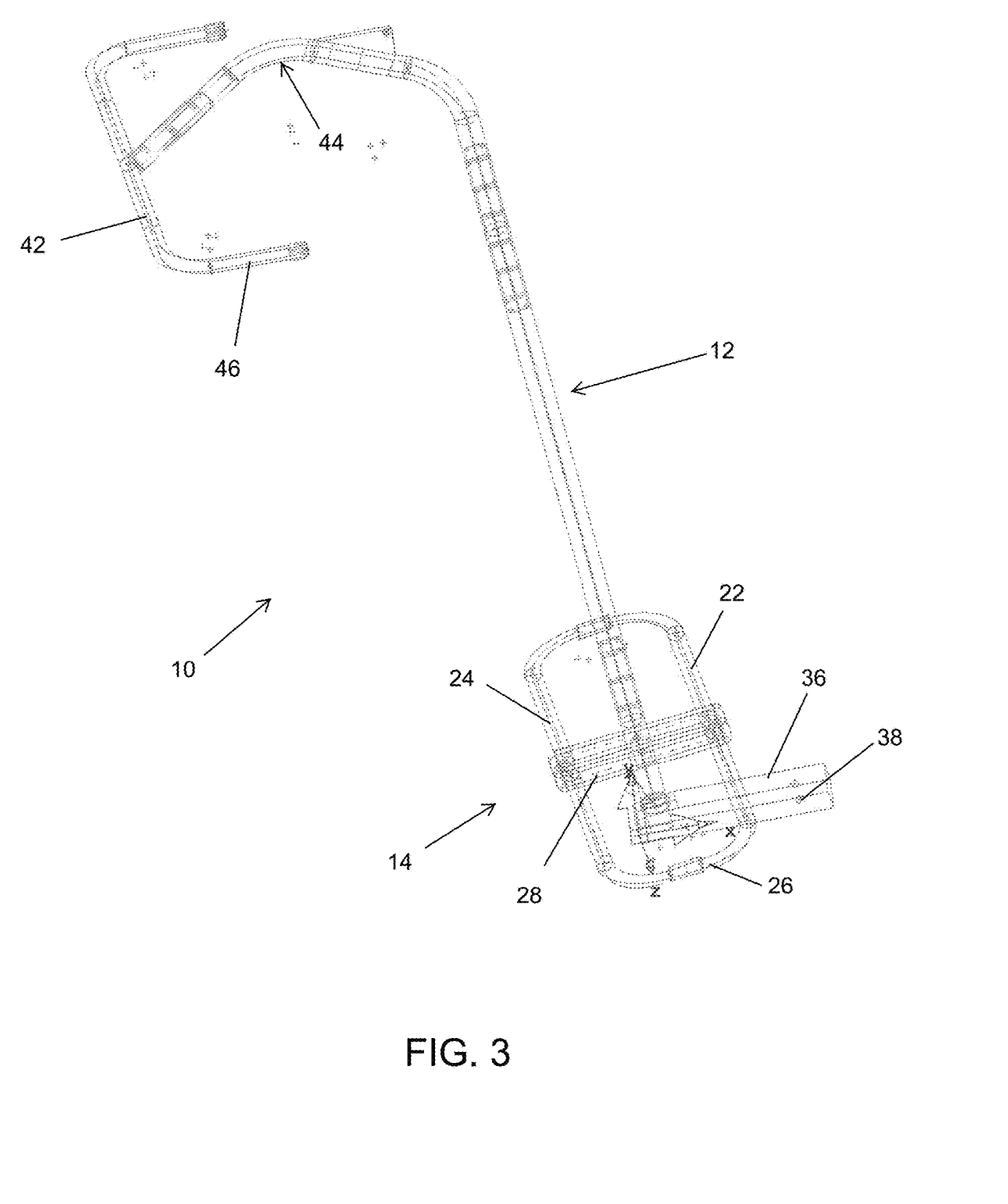
FIG. 3 is another upper perspective view of the kayak carrier of FIG. 1.
Figure 4:
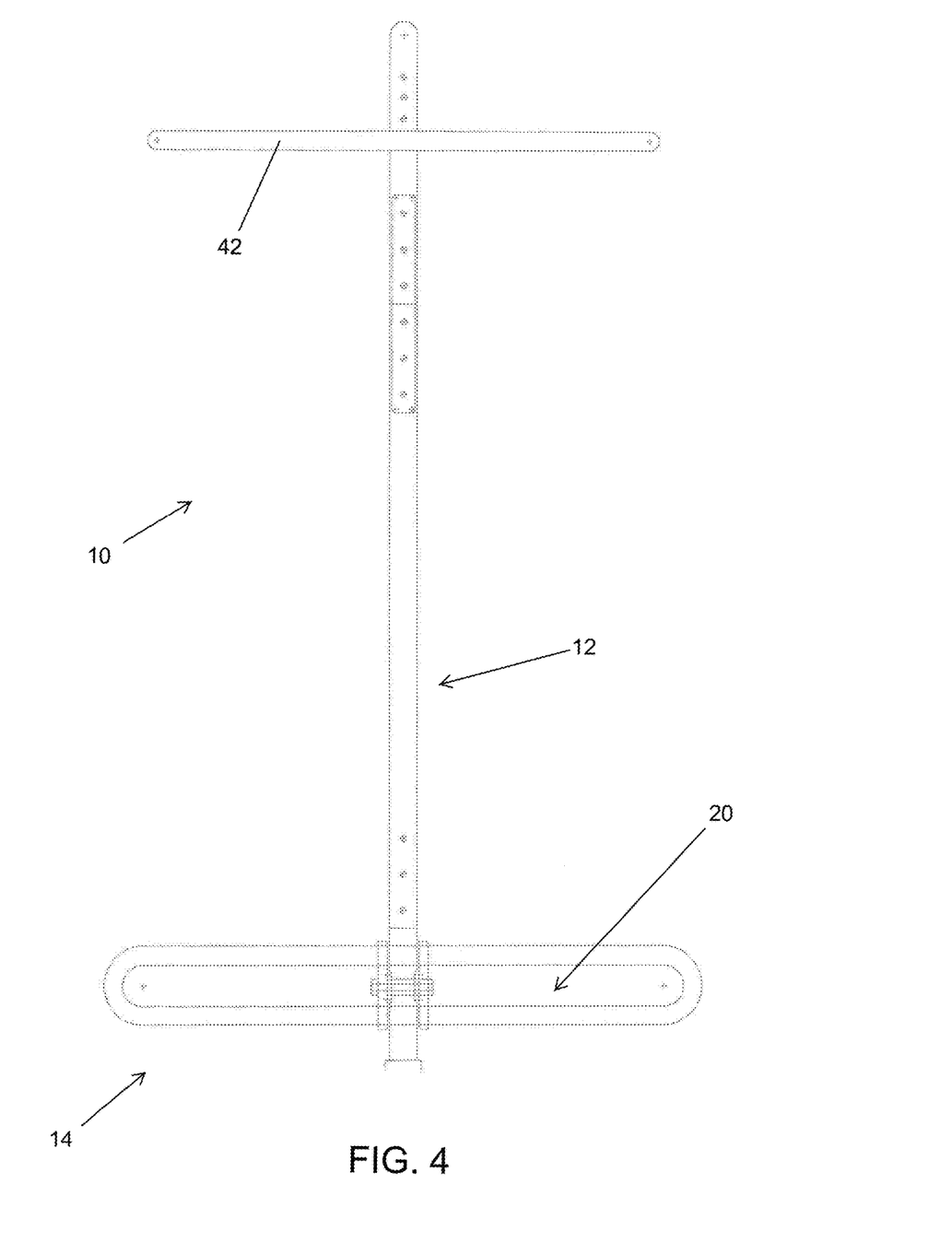
FIG. 4 is a rear elevational view of the kayak carrier of FIG. 1.

A pivotable coupling may be provided between the elongated support 12 and the tip receiver 14, such as between the elongated support 12 and the inboard member 28, which allows the entire tip receiver 14 to pivot or rotate about a generally horizontal axis relative to the elongated support 12. Such a pivotal coupling may be configured for loading a kayak onto the carrier 10, whereby a tip section of the kayak first engages the tip receiver 14 at a pivoted orientation 30, such as shown in FIG. 2, before pivoting the kayak upward about the pivotal coupling to a loaded position. Initially, a kayak may be in a generally horizontally position to be permitted to engage the tip receiver in the pivoted orientation 30 (FIG. 2), such that tip section of the kayak is inserted into the engagement portion 20 of the tip receiver. The engaged tip section of the kayak is then held in position, which allows the kayak to then be raised to an upright orientation by pivoting the kayak and the tip receiver about the pivotal coupling of the tip receiver. By pivoting the kayak to the upright orientation, the tip receiver is pivoted to a generally horizontal orientation 32 (FIG. 2), such as also shown in FIGS. 1-3, which allows the kayak to engage the upper portion of the elongated support to hold the kayak in the upright orientation or loaded position. A strap or other retaining element may be used to further secure the kayak at the upper region of the elongated support 12, as discussed below.

To secure the carrier 10 to the vehicle, the lower portion of the elongated support 12 is configured to engage a vehicle hitch 16, as shown in FIG. 1. The vehicle hitch 16 may include a generally square-shaped receptacle 34 that is sized to receive a similarly sized mount or mounting shaft that has a correspondingly generally square-shaped cross-sectional shape. As such, the lower portion of the elongated support 12 includes a mounting shaft 36 that engages the vehicle hitch 16 by inserting the shaft 36 into the receptacle 34 to align apertures 38 (FIG. 3) that extend through both the receptacle and the mounting shaft. The aligned apertures 38 thereby receive a pin to hold and maintain the secure engagement of the carrier 10 to the vehicle hitch 16. It is contemplated that additional or alternative coupling arrangements may be utilized.

As illustrated in FIG. 1, the mounting shaft 36 extends rearward from the engagement with the vehicle hitch 16 in a generally horizontal orientation, so that a rear portion of the mounting shaft 36 supports and rigidly couples with a generally vertical or upright section 40 of the elongated support 12. The generally vertical section 40 protrudes upward from the connection with the mounting shaft 36, and may further protrude at a slight rearward angle away from the vehicle, as shown in FIG. 1. It is also contemplated that the rear portion of the mounting shaft 36 may optionally be curved upward or otherwise shaped to connect with the vertical section 40 of the elongated support 12, and further the mounting shaft 36 may optionally be formed as an integral piece of the elongated support 12.

The vertical section 40 of the elongated support 12 may extend upward from the mounting shaft 36 in a substantially linear manner, and as shown in the illustrated embodiments, comprises a metal tube or pipe or the like. At the upper portion of the elongated support 12, the elongated support 12 is configured to provide support to the intermediate section of the kayak held by the kayak carrier 10. The kayak carrier 10 may include a laterally arranged member 42 at or near the upper portion of the elongated support 12 that is configured to provide rearward support to the intermediate section of the kayak, as shown in FIG. 1. The laterally arranged member 42 may be connected to the vertical section 40 of the elongated support 12 by a rearward protruding section 44 of the elongated support 12. Optionally, instead of having a rearward protruding section, the vertical section 40 of the elongated support 12 may also be angled rearward sufficiently to allow the laterally arranged member 42 to be connected directly to the upper end of the vertical section 40.

The laterally arranged member 42 may optionally be curved and may optionally include a lateral retaining element or portion or member 46 that protrudes forward from an end portion of the laterally arranged member 42, such as shown in FIGS. 2 and 3. Such a retaining member 42 is configured to provide lateral support to the intermediate section of the kayak on the carrier. Accordingly, the retaining member 46, laterally arranged member 42, and rearward protruding section 44 are configured to border three sides of the intermediate section of the kayak, and thereby define a cradle at the upper portion of the elongated support 12. The retaining member 46, however, maintains a sufficient distance away from the rear surface of the vehicle to allow the intermediate section of a kayak (when its tip is received at the receiving element and the kayak is pivoted to a generally vertical orientation) to be inserted and moved laterally past the retaining member 46 and into abutting engagement with the rearward protruding section 44 of the elongated support 12.

To hold a kayak in the upright orientation on the carrier 10, the kayak carrier 10 may optionally include an attachment strap 48 that is configured to secure the intermediate section of the kayak to the elongated support 12. As shown in FIG. 7, the attachment strap 48 may be secured to an eyelet that is connected to the end of the retaining member 46. The strap 48 then spans the lateral length of the lateral section 42 to engage the elongated support 12. For example, and such as shown in FIG. 7, the strap may be secured to the rearward protruding section 44 of the elongated support 12 behind a protrusion or enlarged section on the rearward protruding section 44, which may limit or preclude the secured strap from sliding forward on the support 12 and thereby loosening the secure confinement provided by the strap 48. It is contemplated that the strap may optionally comprise a fabric strap or cord that includes one or a combination of elastomeric materials, nylon, or the like. Further, it is conceivable that the attachment strap may include a ridge polymer, rubber section, or other attachment element that secures the kayak to the elongated support (such as a separate member or element that hingedly attaches at the ends of the retaining member and pivots to a closed orientation to secure the kayak within an opening at the upper end of the support member).

Figure 5:
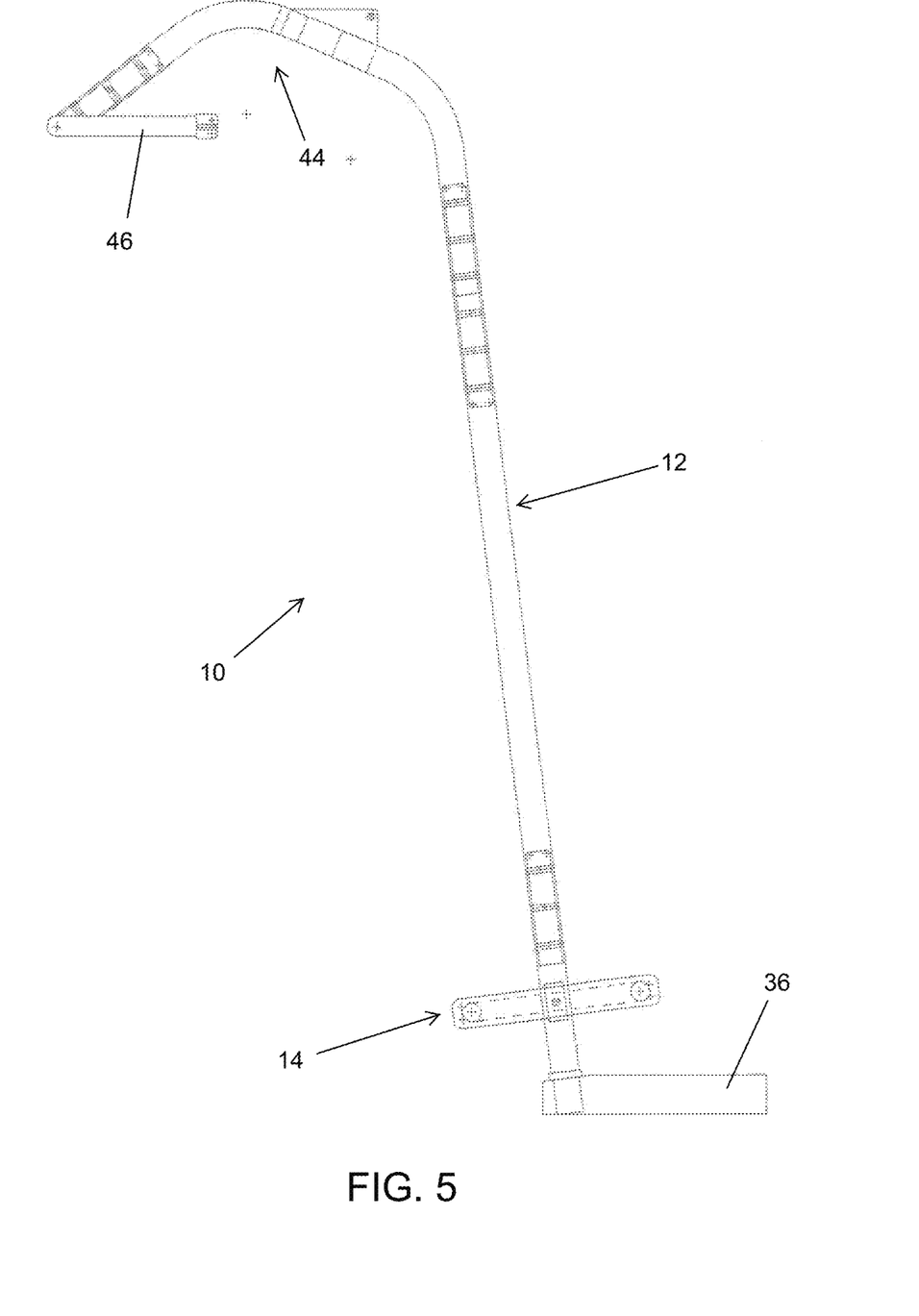
FIG. 5 is a side elevational view of the kayak carrier of FIG. 1.

As illustrated in the side view of FIG. 5, the rearward protruding section 44 of the elongated support 12 may include an upward bulging curvature or bent angle at an intermediate extent of the rearward protruding section 44 to form an inverted hook shape with the vertical section of the elongated support 12. Accordingly, the rearward protruding section 44 may be shaped to provide lateral support to the kayak, such as to the upper or lower surface of the intermediate section of the kayak. When viewed from above, as shown in FIG. 6, the connection between the rearward protruding section 44 and the laterally arranged member may together form a T-shaped support that provides two separate areas and supportive structure for holding a kayak. The rearward protruding section 44 of the upper portion of the elongated support is thereby arranged to provide lateral support to the two adjacent kayaks held by the carrier 10.

Accordingly, the kayak carrier of the present invention may be configured to support at least two kayaks, canoes, or vessels in a side-by-side upright orientation. In the illustrated examples, two tip receivers 14 are pivotally coupled with the lower portion of the elongated support 12, such that the tip receivers 14 may be independently pivoted relative to each other for two kayaks to be separately loaded onto and supported by the kayak carrier 10. More specifically, the kayaks may be loaded sequentially by first loading a kayak by inserting the tip section into the tip receiver and pivoting the kayak upward about the pivotal coupling and inserting the intermediate section into the cradle at the upper portion of the elongated support. With holding two kayaks, it contemplated that a single strap may be used to attach the kayaks to the elongated support.

Optionally, the kayak carrier may alternatively include a tip receiver that has a two or more engagement portions for engaging tip sections of two or more separate kayaks that can be simultaneous supported by the kayak carrier. In such an optional embodiment, the tip receiver may pivot the first and second engagement portions simultaneously, to allow or more two kayaks to be loaded together on the tip receiver of the carrier and engaged to a single side of the elongated support 12. Such an optional configuration would also allow for the carrier to support more than two kayaks or vessels or the like.

Optionally, the kayak carrier may alternatively include a single tip receiver that has a first engagement portion and a second engagement portion, such as on opposing lateral sides of the elongated support, for engaging tip sections of two separate kayaks that can be simultaneous supported by the kayak carrier. In such an optional embodiment, the tip receiver may pivot the first and second engagement portions simultaneously, to allow for two kayaks to be loaded on the carrier together in a side-by-side configuration.

Therefore, the carrier of the present invention attaches to a vehicle hitch and is configured for easily loading and supporting the kayaks, canoes, or other small vessels in a vertical or otherwise upright orientation near the rear hitch area of a vehicle. The kayak carrier includes a tip receiver that is pivotally or movably coupled near the vehicle hitch, to allow a tip section of a kayak to engage and hold the tip section while the body of the kayak is raised upward to an upright orientation. Thus, a kayak may be readily loaded into the carrier by a single person without having to lift the kayak overhead or onto the roof of the vehicle. In the upright orientation, the kayak carrier includes an elongated support having an upper portion that is configured to engage and provide support to the upper or intermediate section of the kayak held by the kayak carrier.

Changes and modifications in the specifically described embodiments may be carried out without departing from the principles of the present invention, which is intended to be limited only by the scope of the appended claims as interpreted according to the principles of patent law.

The invention claimed is:

1. A kayak carrier for a vehicle hitch, said kayak carrier comprising:
    an elongated support having a lower portion configured to engage a vehicle hitch, the elongated support having a forward-facing surface directed toward the vehicle and a rearward-facing surface directed away from the vehicle when the vehicle hitch is engaged;
    a tip receiver pivotally coupled with the lower portion of the elongated support and pivotable between an initial loading and supporting position in which the tip receiver is oriented to partially support the kayak in a generally horizontal orientation, and a loaded position in which the kayak is supported in a generally upright orientation;
    wherein the tip receiver includes an engagement portion that faces rearwardly in the initial loading and supporting position, and that faces upwardly in the loaded position, wherein the tip receiver is configured to insertably receive a tip section of the kayak with the kayak in a lateral orientation when the tip receiver is in the initial loading and supporting position;
    wherein, when the tip section of the kayak is received in the tip receiver, the tip receiver is pivotable to the loaded position with the tip section of the kayak remaining in the tip receiver to position the kayak in the upright orientation; and
    wherein an upper portion of the elongated support is configured to support to an intermediate section of the kayak held by the kayak carrier in the upright orientation.

2. The kayak carrier of claim 1, wherein the upper portion includes a laterally arranged member configured to provide rearward support to the intermediate section of the kayak held by the kayak carrier.

3. The kayak carrier of claim 1, wherein the upper portion of the elongated support includes a retaining member that protrudes forward from an end portion of the laterally arranged member to provide lateral support to the intermediate section of the kayak held by the kayak carrier.

4. The kayak carrier of claim 1, wherein an attachment strap is detachably secured at the upper portion of the elongated support to secure the intermediate section of the kayak at the elongated support when in the upright orientation.

5. The kayak carrier of claim 1, wherein the tip receiver includes a first engagement portion and a second engagement portion on opposing lateral sides of the elongated support for engaging tip sections of two separate kayaks that can be simultaneous supported by the kayak carrier in a side-by-side, upright orientation.

6. The kayak carrier of claim 1, wherein two tip receivers are pivotally coupled with the lower portion of the elongated support, and wherein the tip receivers are independently pivotable relative to each other, such that two kayaks may be separately loaded onto the kayak carrier.

7. A water vessel carrier for a vehicle hitch, said vessel carrier comprising:
    an elongated support having a lower portion configured to engage a vehicle hitch and an upper portion that is configured to support an intermediate section of a vessel held by the vessel carrier;

a rigid tip receiver pivotally coupled with the lower portion of the elongated support and defining an opening sized and shaped to insertably receive a tip section of the vessel with the tip section extending through the tip receiver; and the elongated support having an upper portion configured to support an intermediate section of the vessel in an upright orientation;

wherein the tip receiver is pivotable from an initial tip-receiving orientation with the vessel in a lateral orientation, to a transport-ready orientation with the vessel supported in the upright orientation, in response to raising the vessel from the lateral orientation to the upright orientation with the tip section of the vessel inserted into the opening of the tip receiver.

8. The vessel carrier of claim 7, wherein the tip receiver comprises a continuous loop of material extending around the opening.

9. The vessel carrier of claim 7, comprising two of the rigid tip receivers independently pivotally coupled to opposite sides of the lower portion of the elongated support.

10. The vessel carrier of claim 7, wherein the upper portion comprises:

a rearward protruding section configured to provide inboard lateral support for the intermediate section of the vessel in the upright orientation;

a laterally arranged member extending outboard from rearward protruding section and configured to provide rearward support to the intermediate section of the vessel in the upright orientation; and a forward protruding section configured to provide outboard lateral support for the intermediate section of the vessel in the upright orientation.

11. The vessel carrier of claim 10, wherein the rearward protruding section extends above the laterally arranged member and the forward protruding section.

\* \* \* \* \*